United States Patent
Wang

(10) Patent No.: US 10,990,257 B2
(45) Date of Patent: Apr. 27, 2021

(54) OBJECT DISPLAYING METHOD, TERMINAL DEVICE, AND COMPUTER STORAGE MEDIUM

(71) Applicant: Tencent Technology (Shenzhen) Company Limited, Shenzhen (CN)

(72) Inventor: Yiran Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 38 days.

(21) Appl. No.: 16/299,849

(22) Filed: Mar. 12, 2019

(65) Prior Publication Data
US 2019/0212900 A1 Jul. 11, 2019

Related U.S. Application Data

(63) Continuation of application No. PCT/CN2017/111146, filed on Nov. 15, 2017.

(30) Foreign Application Priority Data

Dec. 6, 2016 (CN) .......................... 201611109894.3

(51) Int. Cl.
*G06F 3/0484* (2013.01)
*G06F 3/0481* (2013.01)
(Continued)

(52) U.S. Cl.
CPC .......... *G06F 3/04842* (2013.01); *A63F 13/20* (2014.09); *A63F 13/2145* (2014.09);
(Continued)

(58) Field of Classification Search
CPC ............ G06F 3/04842; G06F 3/04817; G06F 3/0488; G06F 3/041; A63F 13/31; A63F 13/55; A63F 13/20
See application file for complete search history.

(56) References Cited

U.S. PATENT DOCUMENTS 6,836,270 B2 * 12/2004 Du .......................... G06T 17/05
345/419
2008/0084325 A1 4/2008 Kim et al.
(Continued)

FOREIGN PATENT DOCUMENTS

CN 102216959 A 10/2011
CN 105597310 A 5/2016
(Continued)

OTHER PUBLICATIONS

International Search Report and Written Opinion from corresponding international application No. PCT/CN2017/111146, 10 pgs., dated Feb. 9, 2018.
(Continued)

*Primary Examiner* — Anil K Bhargava
(74) *Attorney, Agent, or Firm* — Brinks Gilson & Lione

(57) ABSTRACT

An object displaying method and a terminal device are disclosed. The method includes displaying at least a first portion and second portion of a graphic map layer in the first display region and second display region of a display screen of the terminal device, respectively; identifying a target object in the graphic map layer; determining a target display mode according to a current state of the target object among a plurality of states for the target object; and displaying the target object in the second display region according to the target display mode.

21 Claims, 12 Drawing Sheets

(51) Int. Cl.
*A63F 13/31* (2014.01)
*A63F 13/20* (2014.01)
*G06F 3/041* (2006.01)
*A63F 13/55* (2014.01)
*G06F 9/30* (2018.01)
*G06F 3/0488* (2013.01)
*A63F 13/5378* (2014.01)
*A63F 13/2145* (2014.01)
*A63F 13/25* (2014.01)
*A63F 13/822* (2014.01)
*A63F 13/52* (2014.01)
*A63F 13/235* (2014.01)

(52) U.S. Cl.
CPC ............ *A63F 13/235* (2014.09); *A63F 13/25* (2014.09); *A63F 13/31* (2014.09); *A63F 13/52* (2014.09); *A63F 13/5378* (2014.09); *A63F 13/55* (2014.09); *A63F 13/822* (2014.09); *G06F 3/0416* (2013.01); *G06F 3/0488* (2013.01); *G06F 3/04817* (2013.01); *G06F 9/3004* (2013.01)

(56) References Cited

U.S. PATENT DOCUMENTS

| | | | |
|---|---|---|---|
| 2010/0123737 A1* | 5/2010 | Williamson | ............ G06T 15/20 345/672 |
| 2010/0229106 A1* | 9/2010 | Lee | ............ A63F 13/12 715/757 |
| 2011/0131597 A1* | 6/2011 | Cera | ............ G01C 21/32 725/24 |
| 2013/0339868 A1* | 12/2013 | Sharpe | ............ G06Q 10/10 715/739 |
| 2016/0026253 A1 | 1/2016 | Bradski et al. | |
| 2017/0177185 A1* | 6/2017 | Voutta | ............ G06F 3/04886 |
| 2019/0155462 A1* | 5/2019 | Yu | ............ G06F 3/0483 |

FOREIGN PATENT DOCUMENTS

| | | |
|---|---|---|
| CN | 106730827 A | 5/2017 |
| EP | 2194508 A1 | 6/2010 |
| EP | 3089013 A1 | 11/2016 |
| JP | 2002092652 A | 3/2002 |
| JP | 2008-228943 A | 10/2008 |
| JP | 5938131 B1 | 6/2016 |

OTHER PUBLICATIONS

Office Action dated Jun. 2, 2020 for Japanese Application No. 2019-528143, 16 pages.

Office Action dated Jun. 10, 2020 for Canadian Application No. 3,042,322, 4 pages.

Office Action issued on Indian Application No. 201927017255 dated Dec. 28, 2020, 7 pages.

* cited by examiner

OBJECT DISPLAYING METHOD, TERMINAL DEVICE, AND COMPUTER STORAGE MEDIUM

RELATED APPLICATION

This application claims priority to International PCT Application No. PCT/CN2017/111146, filed with the Chinese Patent Office on Nov. 15, 2017, which claims priority to Chinese Patent Application No. 201611109894.3, filed with the Chinese Patent Office on Dec. 6, 2016, both entitled "OBJECT DISPLAYING METHOD AND TERMINAL DEVICE", which are herein incorporated by reference in their entireties.

FIELD OF THE TECHNOLOGY

The present disclosure relates to content and object display in electronic devices, and in particular, to display object in a layers and with visual representation.

BACKGROUND OF THE DISCLOSURE

With the advancement of functionality of a terminal device, an application (APP) running on the terminal device can display a layer on a display screen of the terminal device to implement a specific function. For example, a navigation APP can display a map on the display screen of the terminal device to provide a positioning and navigation service. To improve service efficiency of the APP and to make it convenient for a user to view content displayed on the layer, a "small map" may be further displayed on the display screen. In this way, the content in the layer may be simultaneously displayed on the display screen layer and an additional overlaid "small map".

Using FIG. 1 as an example, an application interface 100 is displayed on the display screen of the terminal device. A small map 101 is displayed on an upper-left corner of the application interface 100. The small map 101 can display a location, channel information and the like of a simulated object. The simulated object, for example, may be a character of a game and the application interface 100 may display a game scene. The game may be a source contention game or APP. In such a resource contention APP, a plurality of task-oriented resource points 103 may be contended for, and may be displayed on the small map 101.

In the existing technology, due to a limited size of the display screen of the terminal device, display modes of different task-oriented resource points 103 on the small map 101 may be displayed with similar style. Accordingly, the user (or gamer) of the APP cannot visually distinguish the different task-oriented resource points 103 displayed on the small map 101. This reduces operation efficiency of the user in a task-oriented resource point contention operation process.

SUMMARY

Embodiments of the present disclosure provide a multi-region object displaying method and a terminal device, to enable a user to distinguish different target objects, thereby improving efficiency of performing operation on the different target objects by the user.

In one implementation, a method for displaying target object is disclosed. The method includes. receiving data for a graphic map layer; determining a first display region and a second display region on the display screen, wherein the second display region is within and overlaid on the first display region on the display screen; displaying at least a first portion of the graphic map layer in the first display region; identifying a target object from the data, the target object being associated with the graphic map layer according to a first coordinate in the graphic map layer; obtaining a target display mode corresponding to the target object, the target display mode being used for identifying a current state of the target object among a plurality of states for the target object; displaying at least a second portion of the graphic map layer in the second display region on the display screen, wherein the second portion encompasses the target object according to the first coordinate for the target object in the graphic map layer; mapping the target object into the second display region of the display screen according to the first coordinate; and displaying the target object in the second display region in the target display mode and according to the first coordinate.

In another implementation, a terminal device for displaying target object is disclosed. The terminal device includes a memory for storing instructions; a display screen; and a processor in communication with the memory. The processor, when executing the instructions, is configured to receive data for a graphic map layer; determine a first display region and a second display region on the display screen, wherein the second display region is within and overlaid on the first display region on the display screen; display at least a first portion of the graphic map layer in the first display region; identify a target object from the data, the target object being associated with the graphic map layer according to a first coordinate in the graphic map layer; obtain a target display mode corresponding to the target object, the target display mode being used for identifying a current state of the target object among a plurality of states for the target object; display at least a second portion of the graphic map layer in the second display region on the display screen, wherein the second portion encompasses the target object according to the first coordinate for the target object in the graphic map layer; map the target object into the second display region of the display screen according to the first coordinate; and display the target object in the second display region in the target display mode and according to the first coordinate The terminal device can obtain the target display mode corresponding to the target object displayed on the layer, map the target object into the second display region, and display the target object in the second display region in the target display mode. According to this implementation, there may be more than one target objects and different target objects may correspond to different target display modes, so that the different target objects can be displayed in the second display region according to the different target display modes. A user can thus distinguish the different target objects, thereby improving efficiency of performing operation on the different target objects by the user.

DESCRIPTION OF EMBODIMENTS

Embodiments of the present disclosure provide a content and object displaying method and a terminal device, to improve efficiency of distinguishing, by a user, different objects displayed on a display screen of a terminal device.

To provide better understanding of the solution of the present disclosure, the following describes the technical solutions and implementations in detail with reference to the accompanying drawings. The embodiments described below are merely examples. Other embodiments and implementations that may be derived by a person of ordinary skill in the art based on the disclosed implementations without creative efforts shall fall within the protection scope of the present disclosure.

In the specification, claims, and accompanying drawings of the present disclosure, the terms "first", "second", "third", "fourth", and the like, when used, are intended for distinguishing between similar objects rather than describe a specific order. It should be understood that the entities or elements termed in such a way are interchangeable in proper circumstances so that the embodiments described herein can be implemented in other orders than the order illustrated or described herein. Moreover, the terms "include", "contain" and any other variant are meant to cover non-exclusive inclusion. For example, a process, method, system, product, or device that includes a list of steps or units is not necessarily limited to those steps or units expressly listed, but may include other steps or units not expressly listed or inherent to such a process, method, product, or device.

Figure 1:
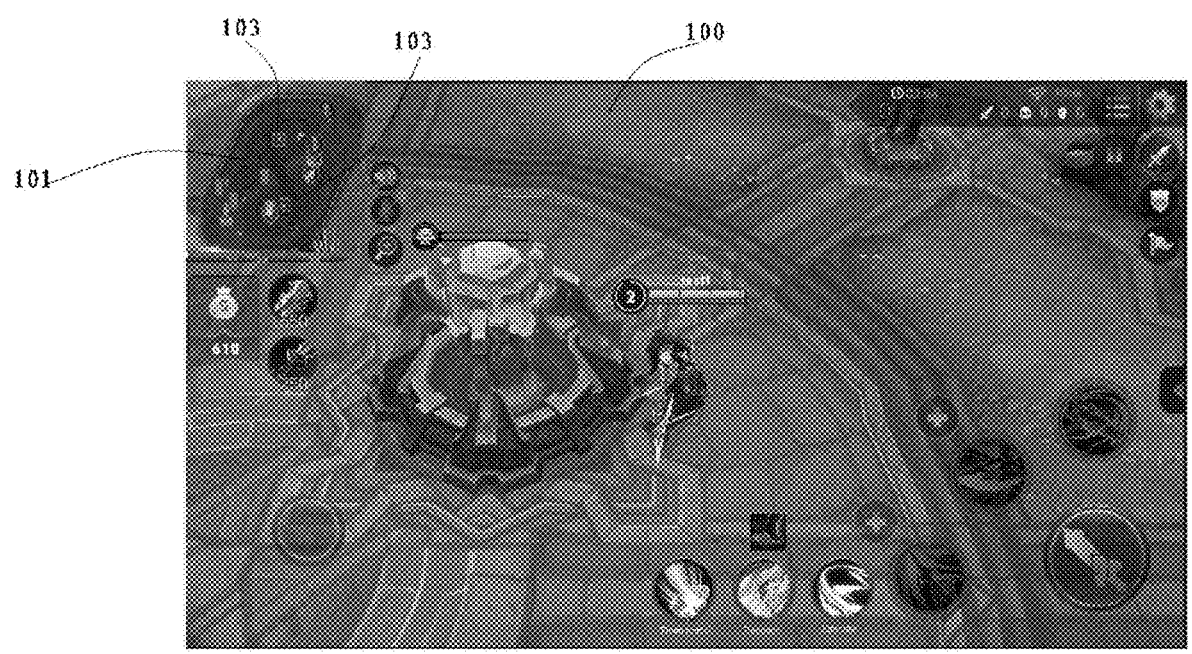
FIG. 1 is a schematic diagram of an application interface displayed on a display screen of a terminal device according to the existing technology.
Figure 2:
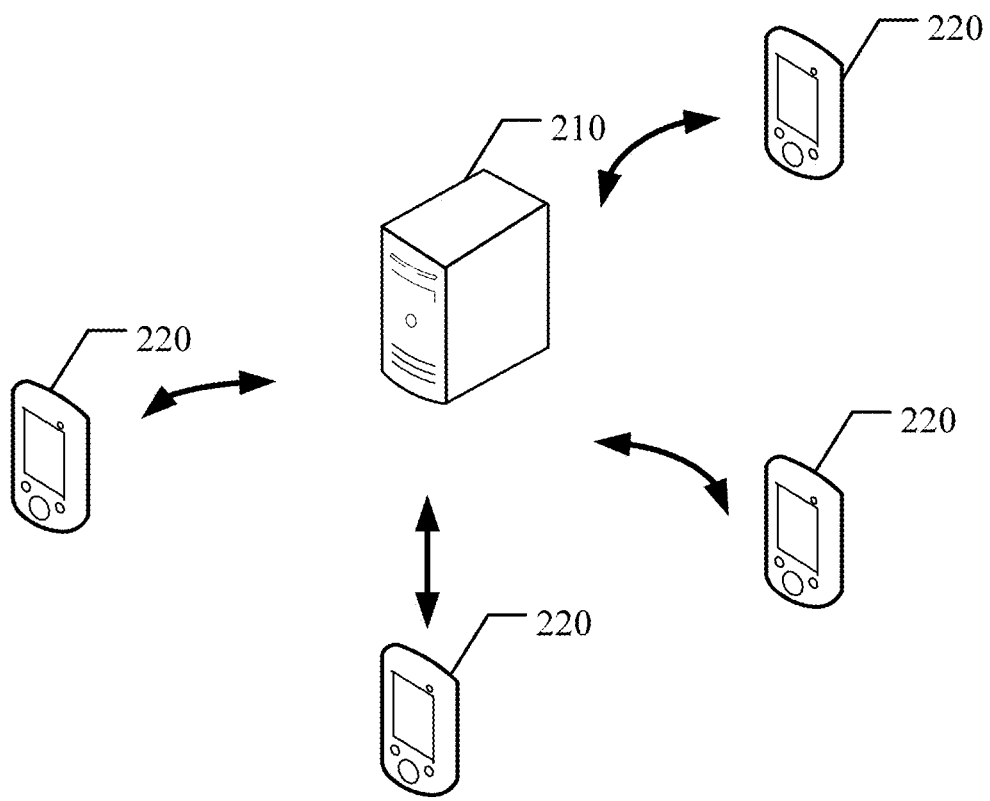
FIG. 2 is an architectural schematics of a communications system.

The embodiments of the present disclosure provide an object displaying method. The method is applied to a communications system. Referring to FIG. 2, FIG. 2 is a schematic diagram of a communications system according to an embodiment of the present disclosure. The communications system includes a server 210 and at least one terminal device 220.

The server 210 can exchange data with the terminal device 220, thereby implementing the object displaying method in this embodiment.

Figure 3:
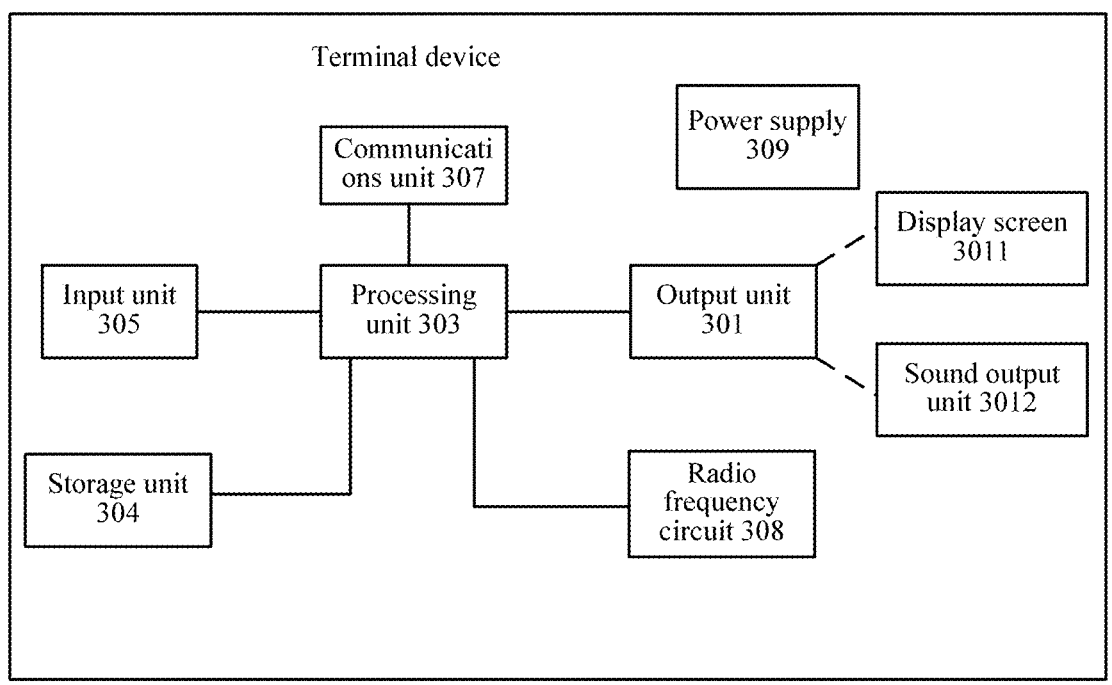
FIG. 3 is a schematic diagram of an exemplary terminal device.

The following describes a specific structure of the terminal device in this embodiment with reference to FIG. 3. FIG. 3 is a schematic structural diagram of an embodiment of a terminal device according to an embodiment of the present disclosure.

The terminal device includes components such as an input unit 305, a processing unit 303, an output unit 301, a communications unit 307, a storage unit 304, and a radio frequency (RF) circuit 308.

These components communicate with each other by using one or more communication buses. A persons of ordinary skill in the art may understand that the implementation of the terminal device shown in FIG. 3 does not limit the present disclosure, may be of a bus structure or a star structure, and may include more or fewer components than those shown in the figure, or some components may be combined, or a different component deployment may be used.

In an implementation of the present disclosure, the terminal device may be any mobile or portable electronic device, including by is not limited to a smartphone, a mobile computer, a tablet computer, a personal digital assistant (PDA), a media player, a smart television, and the like.

The terminal device includes:

the output unit 301, configured to output a to-be-displayed image or other content.

Specifically, the output unit 301 includes but is not limited to a display screen 3011 and a sound output unit 3012, e.g., a speaker.

The display screen 3011 is used for outputting text, an image, and/or a video. The display screen 3011 may include a display panel, for example, a display panel configured in a form of a liquid crystal display (LCD), an organic light-emitting diode (OLED), a field emission display (FED), and the like. Alternatively, the display screen 3011 may include a reflective display such as an electrophoretic display, or a display using an interferometric modulation of light technology.

For example, when a touchscreen detects a touch operation on the touchscreen or a gesture operation near the touchscreen, the touchscreen transmits the operation signal to the processing unit 303 to determine a type of the touch event. Then, the processing unit 303 provides a corresponding visual output on the display panel according to the type of the touch event. Although in FIG. 3 the input unit 305 and the output unit 301 implement input and output functions of the terminal device as two independent components, in some embodiments, the touchscreen and the display panel may be integrated to implement the input and output functions of the terminal device. For example, the display screen 3011 may display various graphical user interfaces (GUI) that are used as virtual control components, including but are not limited to a window, a scroll bar, an icon, and a clipboard, so that a user may perform an operation by performing touching.

In a specific implementation of the present disclosure, the display screen 3011 includes a filter and an amplifier, configured to filter and amplify a video output by the processing unit 303. The sound output unit 3012 includes a digital-to-analog converter, configured to convert an audio signal output by the processing unit 303 from a digital format to an analog format.

The processing unit 303 is configured to run corresponding code, and process received information to generate and output a corresponding interface.

Specifically, the processing unit 303 is a control center of the terminal device. It connects components of the entire terminal device by using various interfaces and circuits, and performs various functions of the terminal device and/or processes data by running or executing a software program and/or module stored in the storage unit and invoking data stored in the storage unit. The processing unit 303 may include an integrated circuit (IC), It may include a single packaged IC, or may include a plurality of packaged ICs that has same functions or different functions.

For example, the processing unit 303 may include only a central processing unit (CPU), or may be a combination of a graphics processing unit (GPU), a digital signal processor (DSP), and a control chip (for example, a baseband chip) in the communications unit. In this implementation of the present disclosure, the CPU may be of a single operation core, and may also include a plurality of operation cores.

The storage unit 304 is configured to store code and data. The code is run by the processing unit 303.

Specifically, the storage unit 304 may be configured to store a software program and module. The processing unit 303 runs the software program and module stored in the storage unit 304, to implement various functional applications and data processing of the terminal device. The storage unit 304 mainly includes a program storage area and a data storage area, where the program storage area may store an operating system, an APP needed by at least one function such as a voice playing function or an image playing function, and the data storage area may store data (such as audio data or a phone book) established according to use of the terminal device.

In a specific implementation of the present disclosure, the storage unit 304 may include a volatile memory, for example, a nonvolatile random access memory (NVRAM), a phase change RAM (PRAM), and a magnetoresistive RAM (MRAM), and may further includes a nonvolatile memory, for example, at least one magnetic disk storage, an electrically erasable programmable read-only memory (EEPROM), a flash memory such as a NOR flash memory or a NAND flash memory.

The nonvolatile memory stores the operating system and the APP executed by the processing unit 303. The processing unit 303 loads a running program and data from the nonvolatile memory to a memory and stores data content in a storage apparatuses. The operating system includes various components and/or drives that are used for normal system task control and management such as memory management, storage device control, and power supply management and that facilitate communication among various software and hardware.

In an implementation of the present disclosure, the operating system may be an Android system of Google, an iOS developed by Apple, a Windows operating system developed by Microsoft, or the like, or may be an embedded operating system such as Vxworks.

The APP includes any APP installed in the terminal device, including but is not limited to browser, email, instant message service, word processing, virtual keyboard, widget (Widget), encryption, digital rights management, speech recognition, speech reproduction, positioning (for example, a function provided by a global positioning system), music playback, and the like.

The input unit 305 is configured to implement interaction between a user and the terminal device and/or input information to the terminal device.

For example, the input unit 305 may receive numeric or character information entered by the user, to generate signal input related to user setting or function control. In a specific implementation of the present disclosure, the input unit 305 may be a touchscreen, or may be another human-computer interaction interface such as a physical input key or a microphone, or may be another external information creation apparatus such as a camera.

The touchscreen in this embodiment of the present disclosure may collect a touch operation on the touchscreen or an operation near the touchscreen performed by a user, for example, an operation performed by the user on or near the touchscreen by using any suitable object or accessory such as a finger or a stylus, and drive a corresponding connection apparatus according to a preset program. Optionally, the touchscreen may include two parts: a touch detection apparatus and a touch controller. The touch detection apparatus detects the touch operation of the user, converts the detected touch operation to an electrical signal, and transfers the electrical signal to the touch controller. The touch controller receives the electrical signal from the touch detection apparatus, converts the electrical signal to contact coordinates, and further transfers the contact coordinates to the processing unit 303.

The touch controller may further receive and execute a command sent by the processing unit 303. In addition, the touchscreen may be implemented in a plurality of types, such as a resistive type, a capacitive type, an infrared type, and a surface acoustic wave type.

In another implementation of the present disclosure, the physical input key used by the input unit 305 may include but is not limited to: one or more of a physical keyboard, a functional key (such as a volume control key or a switch key), a track ball, a mouse, and a joystick. The input unit 305, when being in a form of a microphone, may collect a speech input by a user or an environment and convert the speech to a command that is in a form of an electrical signal and that can be executed by the processing unit 303.

In some other implementations of the present disclosure, the input unit 305 may further include various sensors such as a Hall-effect component, configured to: detect a physical stimulus, such as a force, a torque, a pressure, a stress, a location, an offset, a speed, an acceleration, an angle, an angular velocity, a number of revolution, a rotational speed, or a time at which a working state changes, of the terminal device, and convert the physical stimulus to a signal for detection and control. Other sensors may further include a gravity sensor, a tri-axis accelerometer, a gyroscope, an electronic compass, an ambient light sensor, a proximity sensor, a temperature sensor, a humidity sensor, a pressure sensor, a heart rate sensor, a fingerprint sensor, and the like.

The communications unit 307 is configured to establish a communications channel, so that the terminal device is connected to a remote server by using the communications channel to, e.g., download media data from the remote server. The communications unit 307 may include a communications module such as a wireless local area network (WLAN) module, a Bluetooth module, or a baseband module, and an RF circuit corresponding to the communications module, and is configured to perform WLAN communication, Bluetooth communication, infrared communication and/or cellular communications such as Wideband Code Division Multiple Access (W-CDMA) and/or High Speed Downlink Packet Access (HSDPA). The communications module is configured to control communication among the components of the terminal device and may support direct memory access.

In different implementations of the present disclosure, various communications modules of the communications unit 307 are generally shown in a form of an IC chip, and can be selectively combined without including all communications modules and a corresponding antenna group. For example, the communications unit 307 may include only a baseband chip, an RF chip and a corresponding antenna, to provide a communication function in a cellular communications system. By using a wireless communication connection established by the communications unit 307, for example, a WLAN access or a WCDMA access, the terminal device may be connected to a cellular network or the Internet. In some optional implementations of the present disclosure, the communications module of the communications unit 307, for example, the baseband module may be integrated into the processing unit 303, typically, for example, an APQ+MDM series platform provided by Qualcomm.

The RF circuit 308 is configured to receive and send signals during information sending/receiving or a call. For example, the RF circuit 308, after receiving downlink information from a base station, sends the downlink information to the processing unit 303 for processing, and moreover, sends uplink data to the base station. The RF circuit 308 generally includes a known circuit for performing these functions, including but is not limited to an antenna system, an RF transceiver, one or more amplifiers, a tuner, one or more oscillators, a DSP, a codec chip set, a subscriber identity module (SIM) card, a memory, and the like. In addition, the RF circuit 308 may also communicate with a network and another device by wireless communication.

The wireless communication may use any communication standard or protocol, including but is not limited to Global System for Mobile Communications (GSM), General Packet Radio Service (GPRS), CDMA, WCDMA, High Speed Uplink Packet Access (HSUPA) Long Term Evolution (LTE), email, Short Messaging Service (SMS), and the like.

A power supply 309 is configured to supply power for different components of the terminal device, so that the components can function. Generally, the power supply 309 may be a built-in battery such as a commonly used lithium-ion battery or NiMH battery, or may be an external power supply directly supplying power to the terminal device, for example, an AC adapter. In some implementations of the present disclosure, the power supply 309 may further have a broader definition, for example, may further include a power supply management system, a charging system, a power supply fault detecting circuit, a power supply converter or inverter, a power supply state indicator (for example, a light-emitting diode), and any other component related to generation, management and distribution of electric energy of the terminal device.

In an embodiment of this disclosure, an object displaying method is provided. For example, in a game scene, each game includes a plurality of characters, that is, a plurality of objects. The plurality of characters includes a main character advancing forward a progression process of the game. The main character is a target object. In this embodiment of this disclosure, an icon of the target object is displayed according to a state of the target object. Different states of the icon represent different states of the target object, to indicate the states (for example, born or dead of a game character) of the target object to a player.

Figure 4:
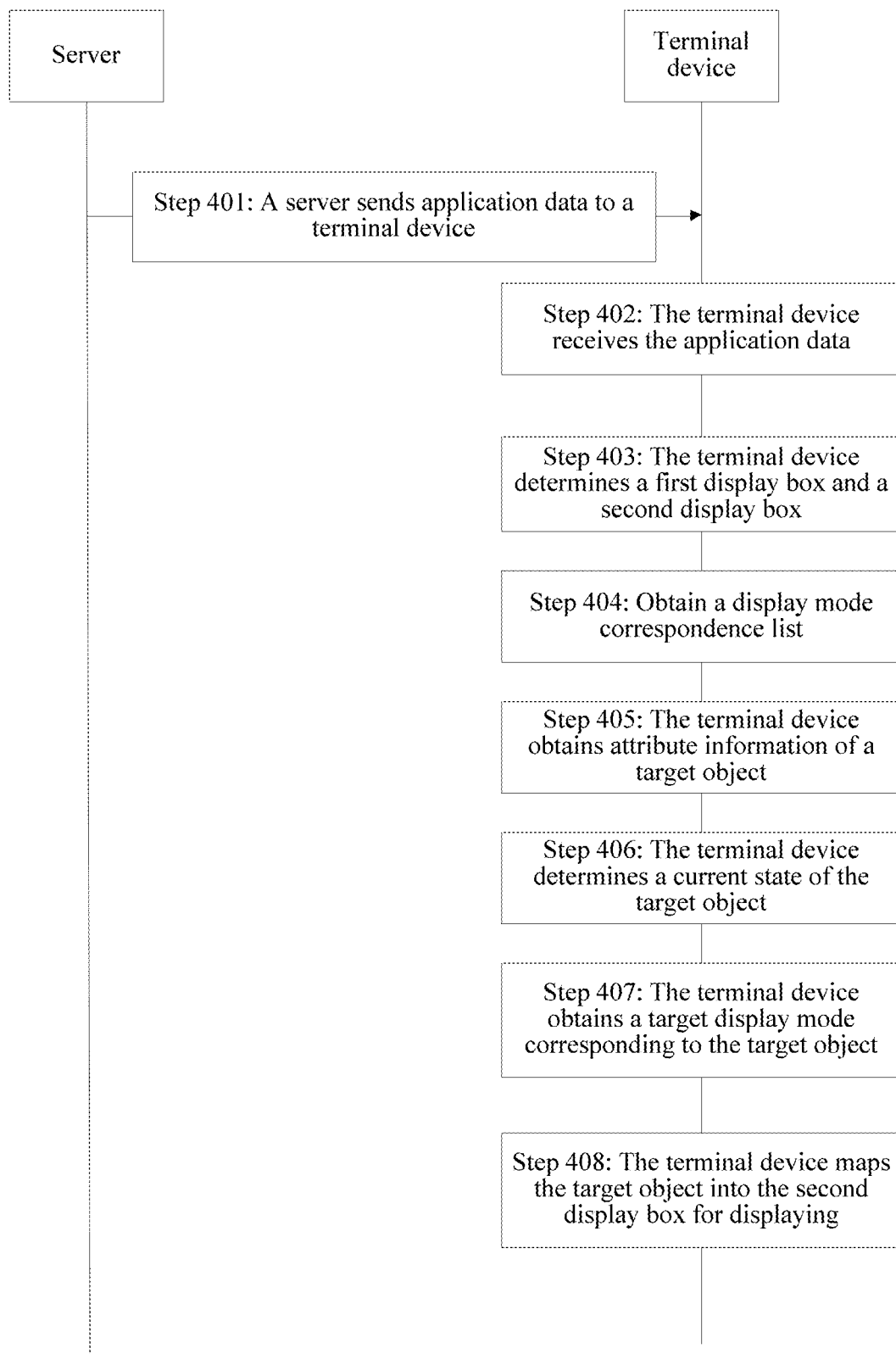
FIG. 4 is a flowchart of an object displaying method.

Based on the communications system of FIG. 2, the following describes, with reference to FIG. 4, a specific procedure of the object displaying method provided in this embodiment:

Step 401: A server sends application data to a terminal device.

The server in this embodiment pre-stores the application data corresponding to a target APP. After the server sends the application data to the terminal device, the terminal device can perform an operation such as install the target APP and/or update the target APP according to application data, so that the terminal device on which the target APP is installed can perform data exchanging with the server.

Step 402: The terminal device receives the application data.

In this embodiment, the terminal device can receive the application data sent by the server and perform a corresponding operation according to the application data. For example, if the terminal device detects that the target APP corresponding to the application data is not installed on the terminal device, the terminal device may install the target APP according to the application data. For another example, if the terminal device detects that a version of the target APP currently installed on the terminal device needs to be updated, the terminal device may update the version of the target APP according to the application data.

It should be noted that, step 401 and step 402 in this embodiment are optional steps, that is, in a process of performing the object displaying method in this embodiment by the terminal device, if the terminal device already stores the application data, for example, if the terminal device already installs the target APP and/or the target APP run by the terminal device is of a latest version, the terminal device does not need to repeatedly obtain the application data from the server. This is not specifically limited in this embodiment.

In this embodiment, the terminal device may read the stored application data, thereby obtaining layer drawing data (or layer rendering data) included in the application data. The terminal device can draw or render a layer according to the layer drawing data and display, on a display screen of the terminal device, a part of the layer or the entire layer as rendered.

Step 403: The terminal device determines a first display region and a second display region.

The first display region and the second display region in this embodiment are used for displaying the layer according to different display ratios. In this embodiment of this disclosure, the layer corresponds to a map in an application scene (or game scene), and the layer is a map layer. In the application scene, the map layer corresponds to an entire global map in the game scene.

The following describes details of how the terminal device displays the layer:

The display screen of the terminal device includes the first display region for displaying the layer, so that some or all regions on the layer are displayed on the first display region.

Figure 5:
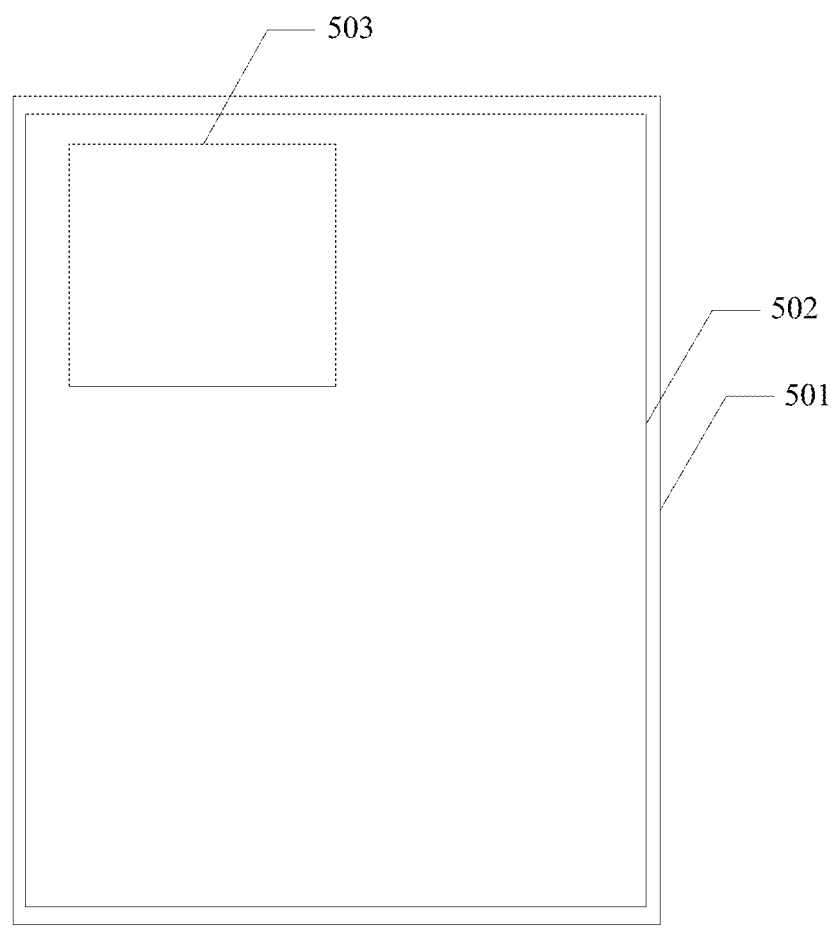
FIG. 5 is a schematic diagram of a display screen of a terminal device according to the present disclosure.

More specifically, as shown in FIG. 5, FIG. 5 is a schematic structural diagram of an embodiment of a display screen of a terminal device according to the present disclosure.

As shown in FIG. 5, a display screen 501 of the terminal device includes a first display region 502, and a black region exists between the display screen 501 and the first display region 502. It should be noted that, in this embodiment, FIG. 5 is merely used as an example rather than a limitation. For example, in another embodiment, the display screen 501 and the first display region 502 may completely overlap each other. For another example, in another embodiment, edge regions of two sides of the display screen are arc-shaped, so that in terms of a display effect, a width of the first display region 502 is larger than a width of the display screen 501 in a horizontal direction of the terminal device at the ends.

A second display region 503 is set in an upper-left corner of the first display region 502 of the terminal device. It should be noted that, in this embodiment, a specific location at which the second display region 503 is located in the first display region 502 is not limited to the example presented in FIG. 5.

In this exemplary embodiment, the second display region 503 is located within the first display region 502. In one implementation, an area of the second display region 503 is smaller than an area of the first display region 502. For example, the first display region is a display interface of the APP, and the second display region 503 is a "small map". In another implementation, the contents of the second display region 503 and the first display region 502 may be switched. For example, when the first display region 502 is displayed on the terminal device, after a switching operation instruction entered by a user is received by the terminal, the contents in the second display region 503 and the first display region 502 quickly switch. For example, when the user presses a function key "S", the content in the first display region 502 is quickly switched to that of the second display region 503. When the user loosens the function key "S", the content in the second display region 503 at the time is switched to that of the first display region 502. In this manner, the content of second display region may be displayed on the display interface of the APP to achieve an expanded view, so that content displayed in the second display region can be displayed with better clarity. Quick switching between the first display region and the second display region does not affect other control operations performed by the player.

To improve efficiency of performing an operation on target objects on the layer by the user, in this embodiment, the first display region and the second display region may display the layer according to different ratios.

For example, the first display region may zoom in some regions of the layer by a preset multiple. Because the first display region can zoom in the layer for displaying, the user can clearly view an interface element displayed on the layer. In this way, the user can easily perform an operation on the interface element on the layer that is displayed on the first display region after being zoomed in. During specific application, the target object may or may not be displayed in the first display region. If the user currently needs to perform an operation on the target object, the target object may be displayed in the first display region. If the user currently does not need to perform an operation on the target object, the target object may not be displayed in the first display region.

To make it convenient for the user to have a global view of the scene and relative position of the target object at any time, the second display region located in the first display region may display a larger region zoomed out from the scene displayed in the first display region. In this way, the user can accurately learn about a specific location of the target object on the layer by using the second display region, thereby improving efficiency of performing an operation on the target object by the user.

In this embodiment, specific content displayed in the second display region is not limited, that is, content that may be displayed in the second display region includes but is not limited to the zoomed-out layer and the target object located on the layer. The second display region may further display various information. For example, the second display region may be used for displaying a shortcut menu for performing functions, and the like.

Step 404: The terminal device obtains a display mode correspondence list.

Specifically, the application data in this embodiment includes the display mode correspondence list. The terminal device may obtain the display mode correspondence list by reading the application data.

The display mode correspondence list in this embodiment includes a correspondence between the target object and a target display mode.

Specifically, the target display mode in this embodiment includes at least one of the following:

the icon of the target object, a color of the icon of the target object and a size of the icon of the target object.

It should be noted that, the description of the target display mode in this embodiment is merely exemplary rather than limiting.

The following describes the display mode correspondence list in detail with reference to a specific application scenario. In this application scenario, a multiplayer online battle arena game (MOBA) that can be run on the terminal device is used as an example.

In the MOBA game, the target object may be a large resource point, e.g., a preset character, a target building, or the like in the game scene. For example, the target object may be an enemy from an opposing foe team or a leading player or a forward on the friend team. Alternatively, the target object may be one or more buildings or other resource points (a quantity of which is not limited) needing to be occupied by the two teams. In short, the target object may be a main character that advances forward through the game progression. For example, the main character may be "master" and a "tyrant" displayed on the layer.

In the method shown in this embodiment, to make it convenient for the user to accurately learn about different states of each target object, the display mode correspondence list in this embodiment further includes at least one state of the target object and a display mode corresponding to any one of the at least one state of the target object. The display mode is used for conveniently identifying a state of the target object, and there is a correspondence between the display mode and the state of the target object. The display mode only needs to be capable of clearly distinguishing the different states of the target object. A specific form of the display mode is not critical. For example, the display mode may be the color of the icon, the size of the icon, a shape of the icon, a flicker state of the icon, an animation state of the icon, and the like. In this embodiment of this disclosure, the different states of the target object are distinguished by using the different display mode. For example, the different states may include but is not limited to: born, grow level one, grow level two, grow level three, dead, and the like.

In some implementations, if in the game scene, the target object is a target building, states of the target building may include: unoccupied, occupied, and the like. In some other implementations, the states of the target building may include: foundation construction, region framework construction, main construction, upgrade level 1, upgrade level 2, collapse, and the like. The states of the target object may vary in different application scenarios.

In an exemplary MOBA game, if the target object is the tyrant, the tyrant may have two different states: born and dead. If the target object is the master, the master has two different states: born and dead.

In some implementations, "tyrant" corresponds to a first icon when tyrant is born. The first icon being in a first color (for example, grey) represents that the "tyrant" is born. The "tyrant" may correspond to a second icon when dead and the second icon being in a second color (for example, yellow) represents that the "tyrant" is dead.

The "master" character may correspond to a third icon when born. The third icon beubg in a third color represents that the "master" is born. The "master" character may correspond to a fourth icon when dead and that the fourth icon is in a fourth color represents that the "master" is dead.

It should be noted that, the first icon may be different from the third icon for representing different characters ("tyrant" or "master"). Because the first icon is different from the third icon, the first color may be the same as or different from the third color. The second color may be the same as or different from the fourth color, provided that the colors can distinguish the different states of the target object.

To distinguish different states of a target object, it may be configured that the same target object corresponds to a same icon or different icons in the different states, namely, the first icon and the second icon may be the same or may be different, and the third icon and the fourth icon may be the same or may be different. In some implementations, each target object corresponds to one icon. That is, the first icon and the second icon may be the same for representing "tyrant" and the third icon and fourth icon may be the same for representing "master".

In some other implementations, the first icon may be of a first shape (for example, square shape) represents that the "tyrant" is born, and the second icon may be of a second shape (for example, round shape) represents that the "tyrant" is dead.

In some other implementations, the first icon with flickers may represent that the "tyrant" is born, and the second icon (which can be the same as the first icon) without flickers may represent that the "tyrant" is dead.

In some other implementations, the first icon may include an animation representing that the "tyrant" is born, and the second icon that may or may not be the same as the first icon may not include an animation, representing that the "tyrant" is dead.

In the embodiment where color of icons is used to represent states, an exemplary display mode correspondence list is shown in Table 1. It should be noted that, Table 1 in this embodiment is merely an example rather than limiting.

TABLE 1

| Target object | State of target object | Target display mode |
|---|---|---|
| Tyrant | born | a first icon, where the first icon is yellow |
| Tyrant | dead | a second icon, where the second icon is grey |
| Master | born | a third icon, where the third icon is purple |
| Master | dead | a fourth icon, where the fourth icon is grey |

It can be learned from Table 1 that, each of the born state and the dead state of each of the target objects tyrant and master has an icon. In this embodiment, the first icon, the second icon, the third icon, and the fourth icon are not limited, provided that the first icon, the second icon, the third icon, and the fourth icon are different icons.

Alternatively, the target display mode corresponding to the target object may further include the size of the icon. For example, a size of the first icon may be different from a size of the third icon. For example, the first icon may be larger than the third icon. The different target objects may be distinguished according to the sizes of the icons. Because a display interface of the "small map" is relatively small, when the different target objects have different sizes, the player can quickly distinguish the different target object. In this way, the different target objects may be indicated clearer. For example, a size of an icon corresponding to a first target object (for example, the tyrant) is 3, and a size of an icon corresponding to a second target object (for example, the master) is 2.

The various implementations of the target display mode corresponding to the target object described above are merely examples. Other implementations are contemplated provided that the display mode correspondence list can distinguish different states of a same target object and different target objects via different icons and/or different display modes.

Step 405: The terminal device obtains attribute information of a target object.

In this embodiment, the application data read by the terminal device further includes the attribute information of the target object. The attribute information is used for identifying the target object. In this embodiment, the attribute information of the target object is not limited, provided that the terminal device can determine the target object by using the attribute information of the target object.

Using the MOBA game as an example, the terminal device can determine whether the target object is the tyrant or the master according to the attribute information of the target object.

Specifically, in this embodiment, the terminal device can further determine the at least one state of the target object according to the attribute information of the target object.

The attribute information of the target object corresponds to any one of the at least one state of the target object, that is, correspondences are established between the attribute information of the target object and the different states of the target object.

Further, using the MOBA game as an example, the terminal device can determine, according to the attribute information of the target object, a born state or a dead state of each of the target objects tyrant and master, and the like.

Step 406: The terminal device determines a current state of the target object.

In this embodiment, the current state of the target object is a state of the target object corresponding to the attribute information of the target object.

It can be learned that, the terminal device in this embodiment can determine the current state of the target object according to the obtained attribute information of the target object.

In this embodiment, an example is used in which the attribute information of the target object includes at least one of the following:

first coordinates of the target object displayed on the layer, the icon of the target object displayed on the layer, or a start moment at which the target object is generated for the first time and a period of generating the target object. For example, the start moment at which the "tyrant" is generated for the first time is t0 and the period of generating the "tyrant" is T, so that the "tyrant" is generated from t0 to t0+T.

Further, using the MOBA game as an example, in a process of determining the target object, if first coordinates of each target object displayed on the layer are pre-stored in the application data, the terminal device can determine, according to the first coordinates, the target object displayed on the layer by using the first coordinates. If an icon of each target object displayed on the layer is pre-stored in the application data, the terminal device can determine, according to the icon, the target object displayed on the layer by using the icon and/or a state of the target object. If a start moment at which each target object is generated for the first time and a period that the target object is generated are pre-stored in the application data, the terminal device can determine, according to a current moment, a current state (for example, born or dead) of the target object.

Step 407: The terminal device obtains a target display mode corresponding to the target object.

Specifically, the terminal device in this embodiment can determine, according to the display mode correspondence list, the target display mode corresponding to the current state of the target object.

More specifically, after the terminal device determines the current state of the target object in step 406, the terminal device can look up the display mode correspondence list obtained in step 404. The terminal device can determine, according to the display mode correspondence list, the target display mode corresponding to the current state of the target object.

Using Table 1 as an example, if the terminal device determines that the current state of the target object is the born state of the tyrant, the terminal device can determine according to the display mode correspondence list of Table 1 that the corresponding target display mode is "a first icon, where the first icon is yellow". The first icon is an icon corresponding to the tyrant.

Step 408: The terminal device maps the target object into the second display region for displaying.

In this embodiment, the terminal device can map the coordinates of the target object displayed on the layer into the second display region for displaying and display the target object in the second display region in the target display mode. It may be understood that in the game scene, the icon corresponding to the "master" and the icon corresponding to the "tyrant" are displayed in the second display region.

In this embodiment, how to map the target object into the second display region is not limited, provided that the terminal device can determine, according to the first coordinates of the target object displayed on the layer, second coordinates of the target object displayed in the second display region. Specifically, in addition to the target object, an interface element is displayed on the layer. In this embodiment, the interface element is not limited. If the MOBA game is used as an example, the interface element displayed on the layer may be a geographic icon having an identification function and displayed on a map, and the like. In this embodiment, when the target object is mapped into the second display region, only a relative location relationship between the target object and the interface element that are displayed on the layer needs to be mapped into the second display region, that is, only the relative location relationship between the target object and the interface element that are located in the second display region needs to be tracked and maintained.

The following description provides one implementation for mapping manner the target object in the second display region. In this example, the layer is zoomed out by a preset multiple and displayed in the second display region, that is, all regions on the layer can be displayed in the second display region.

The terminal device can obtain the first coordinates, the first coordinates being coordinates of the target object displayed on the layer, and the terminal device determines the second coordinates, the second coordinates being coordinates obtained after the first coordinates are zoomed out by the preset multiple. In this way, the terminal device may display the icon of the target object in the second display region according to the second coordinates.

It should be noted that, an order in which step 407 and step 408 are performed is not limited.

In one implementation, step 407 may be performed before step 408, that is, the target display mode of the target object is determined before the target object is mapped into the second display region in the target display mode.

Alternatively, step 408 may be performed before step 407, that is, the target object is mapped into the second display region before the target object is displayed in the second display region in the target display mode.

Beneficial effects of performing the method in this embodiment are:

Because different states of different target objects correspond to different target display modes, the player can determine the different target objects and current states of the different target objects according to the different target display modes displayed in the second display region, and the player can quickly learn about an actual location of each target object on the layer by using the second display region. It can be learned that, the target display mode of the target object displayed in the second display region can provide an accurate indication to the player, so that the player can determine the current states, global location and direction of motion of the different target objects according to the different target display modes, thereby improving accuracy and efficiency of performing an operation on the target object by the player.

To provide better understanding of the method in this embodiment of the present disclosure, the following describes the method in detail with reference to a specific application scenario.

Figure 6:
FIG. 6 is an exemplary display of an application scene according to the present disclosure.
Figure 7:
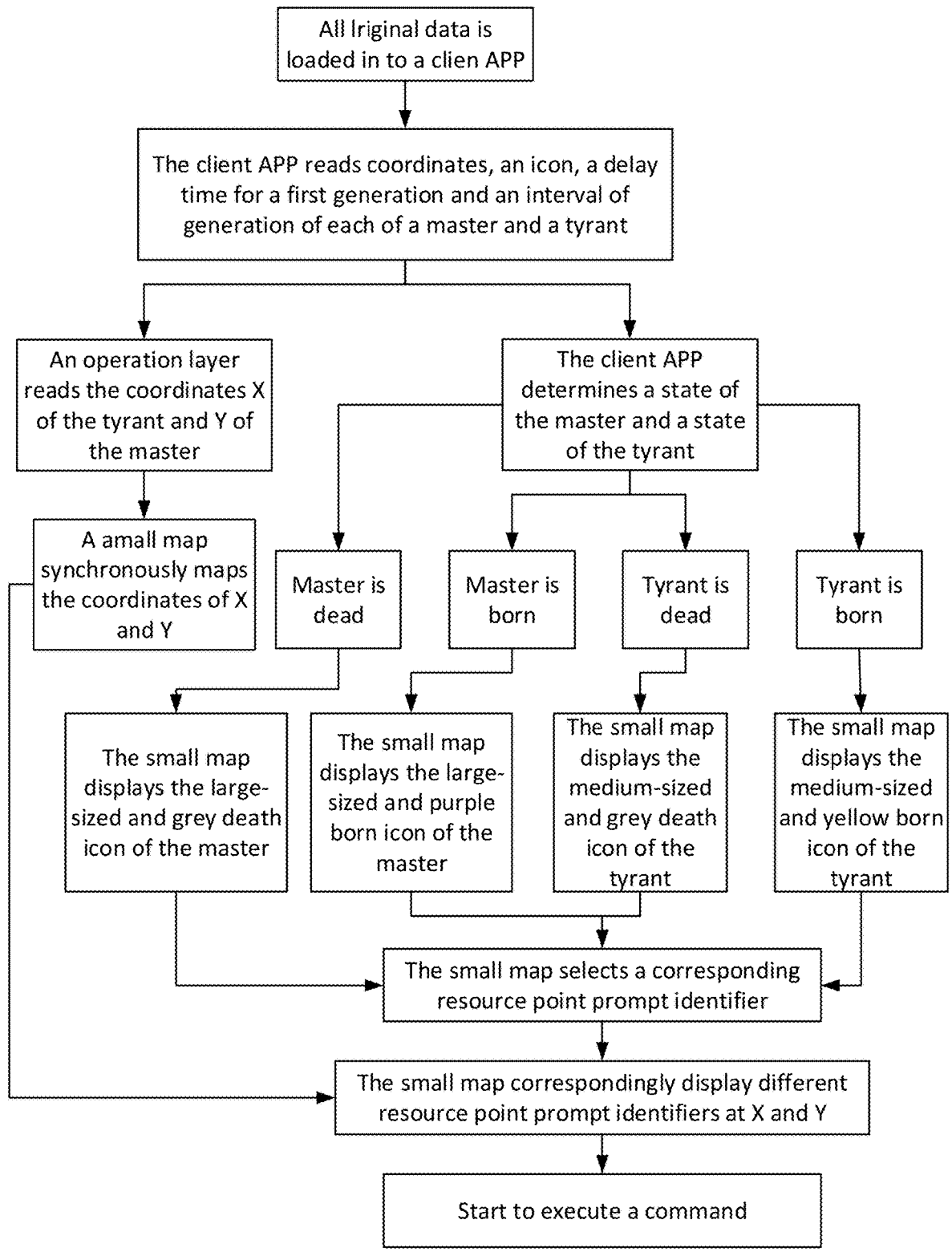
FIG. 7 is an exemplary diagram of another application scene according to the present disclosure.

Referring to FIG. 6 for description, that this application scenario is the MOBA game is used as an example. It should be noted that a scenario to which the method in this embodiment can be applied is not limited to the MOBA game. Only that this application scenario is the MOBA game scene is used as an example for exemplary description.

All original data sent by a server is loaded onto a client of a terminal device in this embodiment. The original data is application data for installing and/or updating the MOBA game, to enable the client of the terminal device to perform an install procedure and/or update procedure of the MOBA game by using the original data.

In the MOBA game, the original data includes layer drawing data. The client of the terminal device can draw an operation layer by using the layer drawing data. As shown in FIG. 6, the operation layer 700 may be a map used for performing positioning in the MOBA game.

Specifically, the original data further includes first coordinates of the tyrant and those of the master on the operation layer, icons of the tyrant and the master displayed on the operation layer, a starting time at which the tyrant is generated for the first time and an interval at which the tyrant is generated, and a delay time at which the master is generated for the first time and an interval at which the master is generated.

More specifically, in the original data, a birth location point of the tyrant and that of the master are preconfigured on the operation layer. The birth location points are respectively the first coordinates corresponding to the tyrant and the first coordinates corresponding to the master. Using the tyrant as an example, the tyrant is born at the already configured birth location point, that is, a location of the first coordinates on the operation layer, and the tyrant is born according to the delay time already configured in the original data and at which the tyrant is generated for the first time. If the tyrant is dead, the tyrant revives according to the interval at which the tyrant is generated.

The client application of the terminal device can read the original data. A game scene layer on which a hero is located and used by the player reads the first coordinates X (coordinates of the tyrant) and Y (coordinates of the master) of the large resource points on the operation layer, thereby synchronously mapping the large resource points into a small map 701 according to the first coordinates X and Y, that is, determining second coordinates X' (coordinates of the tyrant) and Y' (coordinates of the master) in the small map

701. The small map 701 in this application scenario is the second display region, that is, the "small map" in the foregoing embodiment.

In this embodiment, the small map 701 and the operation layer 700 synchronously record location coordinates of the master and the tyrant, and a location of each large resource point on the small map 701 is in a one-to-one correspondence with a location of each large resource point on the operation layer 700.

According to the small map 701 in this embodiment, the player can directly view the location of each large resource point and a region in which the large resource point is located, and a location of a player character on the operation layer. The small map 701 can further display prompt information. The prompt information may be information about a channel at which the player is located, and the like.

The following describes how the client of the terminal device determines whether a current large resource point is the tyrant or the master according to the first coordinates X and Y of the large resource points located on the operation layer, the icons of the large resource points displayed on the operation layer, the delay times at which the large resource points are generated for the first time and the intervals at which the large resource points are generated and determines whether the tyrant is in the dead state or the born state or whether the master is in the dead state or the born state.

The client of the terminal device can display the different states of the large resource points on the small map 701 by using the second coordinates, so that icons displayed at the different second coordinates on the small map 701 are used for indicating and identifying different large resource points. The client executes a final command: Show the icons of the different large resource points at the birth location points at which the master and the tyrant are located on the small map 701.

Figure 8:
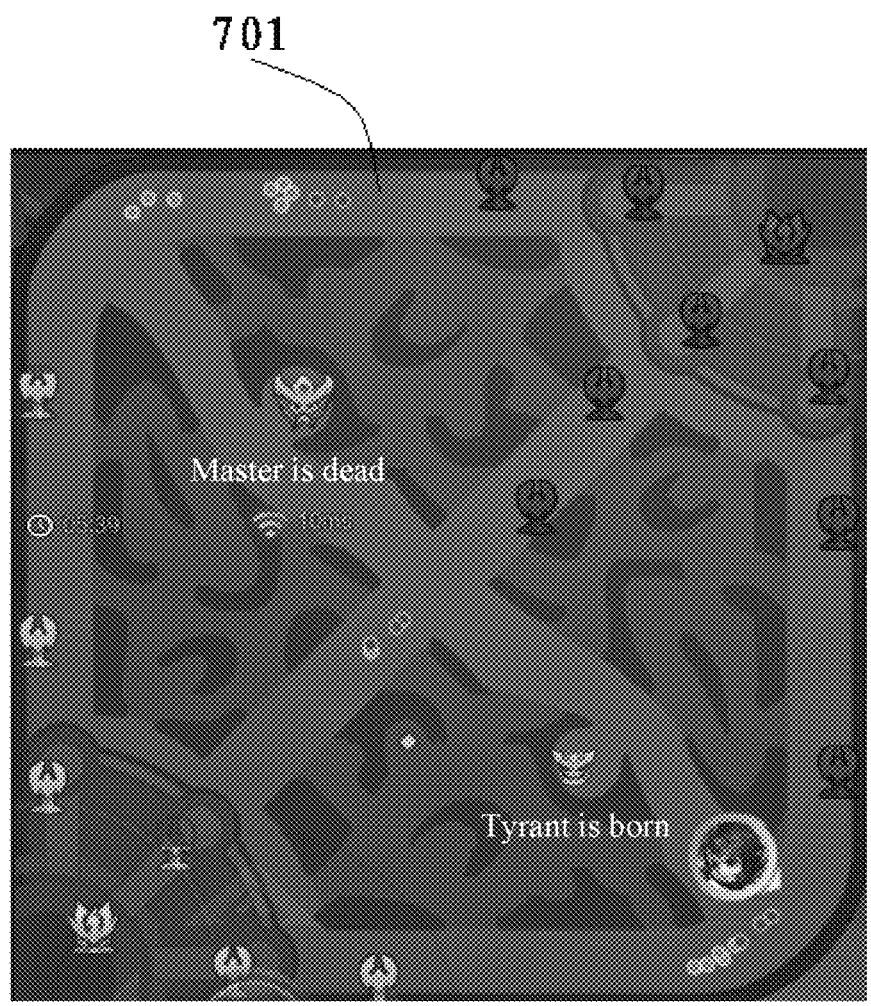
FIG. 8 is an exemplary diagram of another application scene according to the present disclosure.

For this application scenario, continuing with FIG. 6, there are two opposing teams in the MOBA game: a red team and a blue team. When the player is the blue team, for a specific display mode of the small map 701, refer to FIG. 8. The small map 701 automatically rotates to change display locations of the two teams. In this way, the master is located at an upper-left corner and the tyrant is located at a lower-right corner. Specifically, the master and the tyrant are displayed on the small map 701 according to the second coordinates.

If the client of the terminal device determines that the large resource point, the tyrant, is in the dead state and the large resource point, the master, is also in the dead state according to the first coordinates X and Y of the large resource points located on the operation layer, the icons of the large resource points displayed on the operation layer, the delay times at which the large resource points are generated for the first time and the intervals at which the large resource points are generated, the client of the terminal device reads the second icon corresponding to the dead state of the tyrant, and the tyrant in the dead state does not appear on the battlefield, the second icon being medium-sized and grey, and the second icon being displayed on the small map 701; and reads the fourth icon corresponding to the master, and the master in the dead state does not appear on the battlefield, the fourth icon being large-sized and grey, and the fourth icon being displayed on the small map 701. In this application scenario, the medium size and the large size (the actual size of the icons) are not specifically limited, provided that the fourth icon is larger than the second icon (for differentiating the tyrant and the master). Specifically, because the master is more important than the tyrant, the icon of the master may be larger than the icon of the tyrant by one size.

Figure 9:
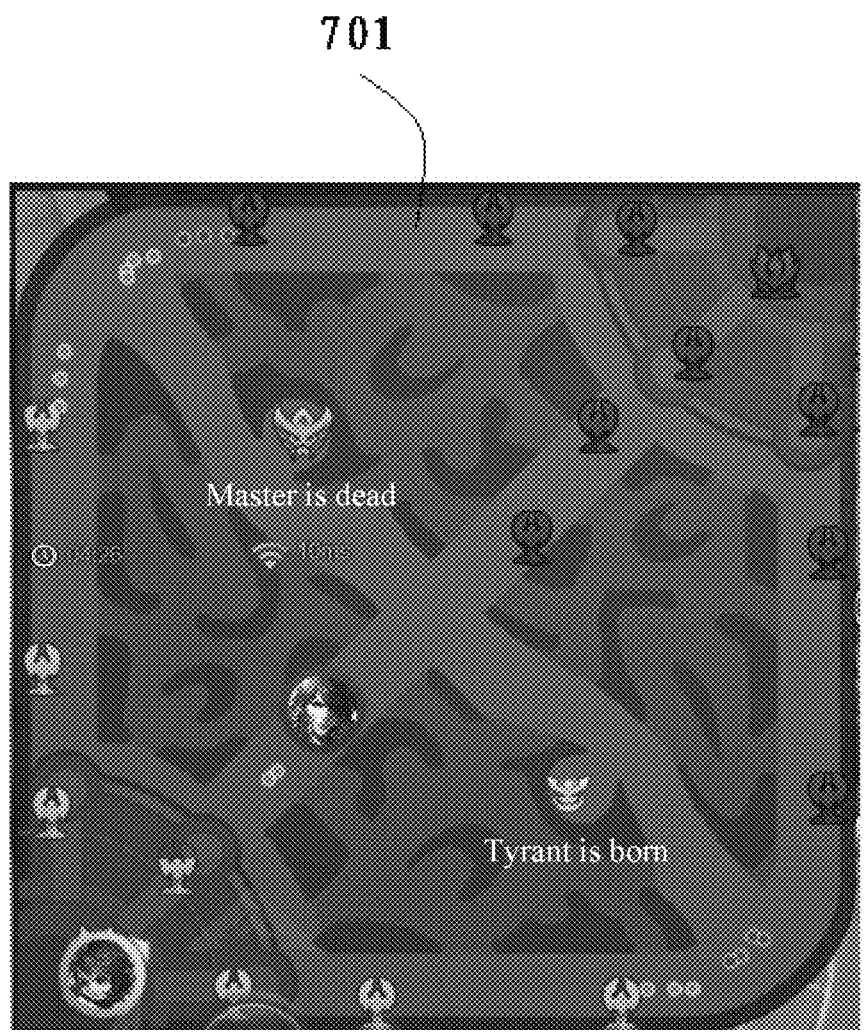
FIG. 9 is an exemplary diagram of another application scene according to the present disclosure.

As shown in FIG. 9, if the client of the terminal determines that the large resource point, the tyrant, is in the born state and the large resource point, the master is in the dead state, the client of the terminal device reads the first icon corresponding to the born state of the tyrant, and the tyrant in the born state appears on the battlefield, the first icon being medium-sized and yellow, and the first icon being displayed on the small map 701; the client of the terminal further reads the fourth icon corresponding to the master, and the master in the dead state does not appear on the battlefield, the fourth icon being large-sized and grey, and the fourth icon being displayed on the small map 701.

Figure 10:
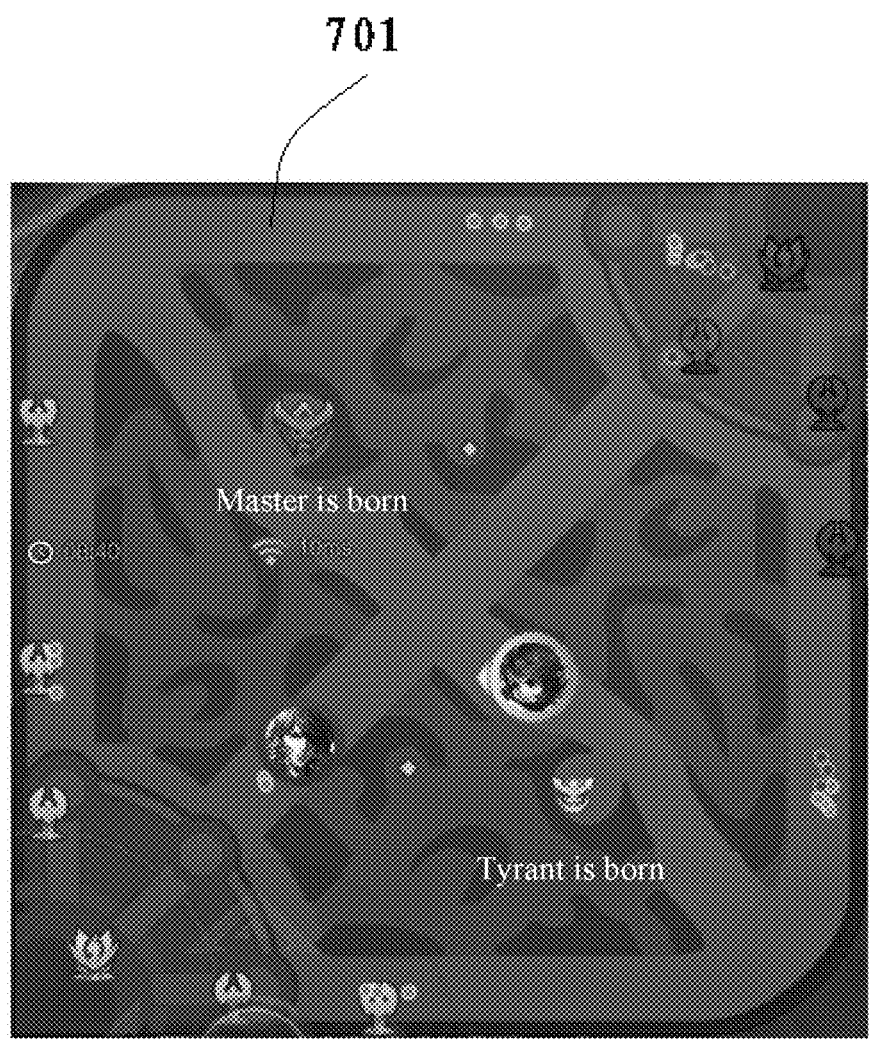
FIG. 10 is an exemplary diagram of another application scene according to the present disclosure.

As shown in FIG. 10, if the client of the terminal determines that the large resource point, the tyrant, is in the born state and the large resource point, the master, is in the born state, the client of the terminal device reads the first icon corresponding to the born state of the tyrant, and the tyrant in the born state appears on the battlefield, the first icon being medium-sized and yellow, and the first icon being displayed on the small map 701; the client of the terminal further reads the third icon corresponding to the master, and the master in the born state also appears on the battlefield, the third icon being large-sized and purple, and the third icon being displayed on the small map 701.

As shown in FIG. 10, if the client of the terminal determines that the large resource point, the tyrant, is in the dead state and the large resource point, the master, is in the born state, the client of the terminal device reads the second icon corresponding to the dead state of the tyrant, and the tyrant in the dead state does not appear on the battlefield, the second icon being medium-sized and grey, and the second icon being displayed on the small map 701; the client of the terminal further reads the third icon corresponding to the master, and the master in the born state appears on the battlefield, the third icon being large-sized and purple, and the third icon being displayed on the small map 701.

Figure 11:
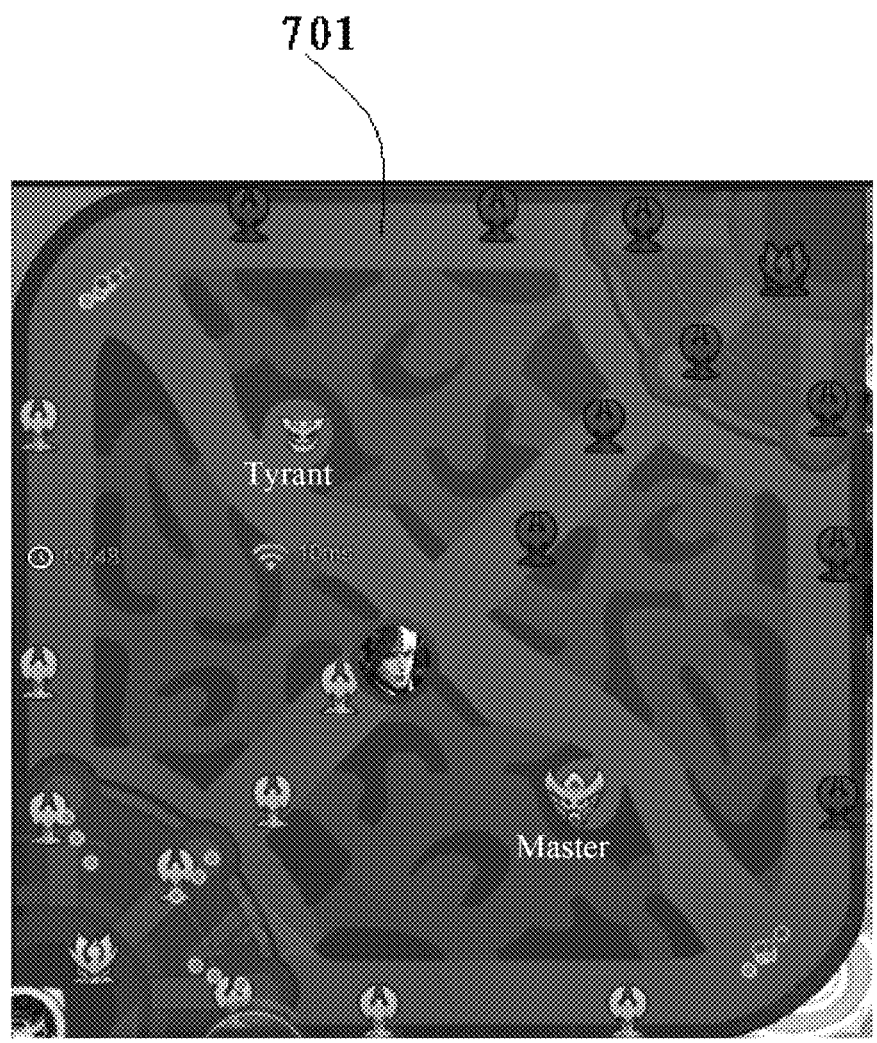
FIG. 11 is an exemplary diagram of another application scene according to the present disclosure.

When the player is the red team, for a specific display mode of the small map 701, refer to FIG. 11. The small map 701 automatically rotates, so that the master is on the lower-right corner and the tyrant is on the upper-left corner.

Using an example in which the client of the terminal device detects that the large resource point, the tyrant, is in the dead state and the large resource point, the master is also in the dead state, the client of the terminal device reads the second icon corresponding to the dead state of the tyrant, and the tyrant in the dead state does not appear on the battlefield, the second icon being medium-sized and grey, and the second icon being displayed on the small map 701; the client of the terminal further reads the fourth icon corresponding to the master, and the master in the dead state does not appear on the battlefield, the fourth icon being large-sized and grey, and the fourth icon being displayed on the small map 701.

It can be learned from this application scenario that the specific icons are designed for the large resource points, the master and the tyrant. The color of the icon of the master that is born is different from the color of the icon of the master that is dead, and the color of the icon of the tyrant that is born is different from the color of the icon of the tyrant that is dead, that is, the different large resource points have different colors during birth, the different large resource points have icons of different display styles, and the icons of the born state and the dead state of a same large resource point have different colors. Therefore, the icons of the master and the tyrant are always grey before the master and the tyrant were born, and respectively correspond to purple and yellow after the master and the tyrant were born, change to grey again when the master and the tyrant are dead, and change colors again when the master and the tyrant revive. In this way, the player can clearly and quickly distinguish the large resource points, the tyrant and the master, according to the styles of the icons, the sizes of the icons, and the colors of the icons that are displayed on the small map.

Figure 12:
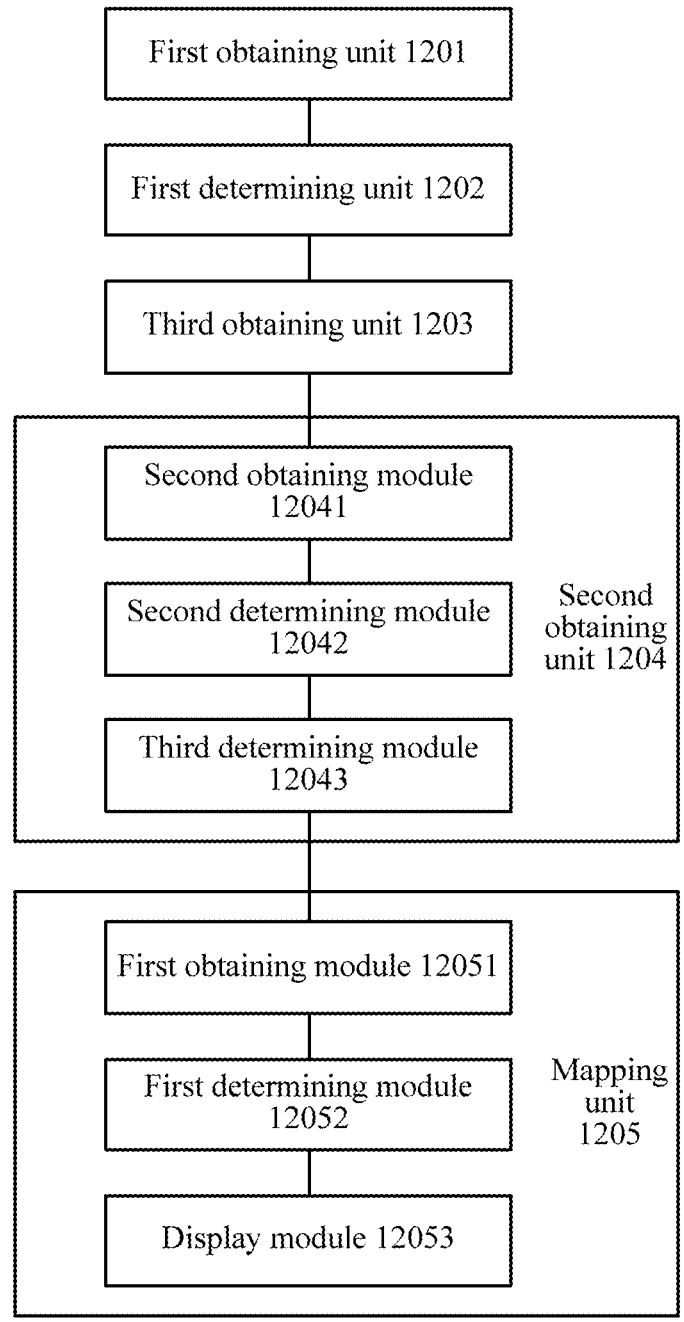
FIG. 12 is a schematic diagram of another terminal device according to the present disclosure.

An embodiment of the present disclosure further provides a terminal device that can implement the method in the foregoing embodiments. For details of a hardware structure of the terminal device, refer to FIG. 3. The following describes, with reference to FIG. 12, a structure of a functional module of the terminal device that can implement the method in the foregoing embodiments.

The terminal device includes:

a first obtaining unit 1201, configured to obtain a target object, the target object being located on a layer, and at least some regions on the layer being displayed in a first display region;

a first determining unit 1202, configured to determine a second display region, the second display region being located in the first display region, an area of the second display region being smaller than an area of the first display region, and the second display region being used for zooming out the at least some regions on the layer by a preset multiple for displaying; and a third obtaining unit 1203, configured to obtain a display mode correspondence list, the display mode correspondence list including a correspondence between the target object and a target display mode; where specifically, the display mode correspondence list includes at least one state of the target object and a display mode corresponding to any one of the at least one state of the target object; and a second obtaining unit 1204, configured to obtain the target display mode corresponding to the target object.

Specifically, the second obtaining unit 1204 includes:

a second obtaining module 12041, configured to obtain attribute information of the target object, the attribute information of the target object corresponding to one of the at least one state of the target object;

a second determining module 12042, configured to determine a current state of the target object, the current state of the target object being a state of the target object corresponding to the attribute information of the target object;

a third determining module 12043, configured to determine, according to the display mode correspondence list, the target display mode corresponding to the current state of the target object; and a mapping unit 1205, configured to map the target object into the second display region, and display the target object in the second display region in the target display mode.

Specifically, the mapping unit 1205 includes:

a first obtaining module 12051, configured to obtain first coordinates, the first coordinates being coordinates of the target object displayed on the layer;

a first determining module 12052, configured to obtain second coordinates according to the first coordinates, the second coordinates being coordinates of the target object displayed in the second display region; and a display module 12053, configured to display the target object in the second display region in a form of the second coordinates.

This application further provides a computer readable storage medium. The computer readable storage medium stores instructions, and the instructions, when run on a computer, cause the computer to perform the object displaying method according to the foregoing method embodiments.

This application further provides a computer program product including instructions, and the computer program product, when run on a computer, causes the computer to perform the object displaying method according to the foregoing method embodiments.

For details of a specific procedure of performing the object displaying method in this embodiment by the terminal device and obtained beneficial effects thereof, refer to the foregoing embodiments. Details are not described in this embodiment.

It may be clearly understood by a person of ordinary skill in the art that, for convenient and brief description, for a detailed working process of the foregoing system, apparatus, and unit, a corresponding process in the foregoing method embodiments may be referred to, and details are not repeated herein.

In the various embodiments provided in this application, it should be understood that the disclosed system, apparatus, and method may be implemented in other manners. For example, the described apparatus embodiment is merely an example. For example, the unit division is merely logical function division and there may be other division manners during actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a non-transitory computer readable storage medium. Based on such an understanding, the essential components of the technical solutions of the present disclosure, or the part contributing to the existing technology, or all or some of the technical solutions may be implemented in the form of a software product. The computer software product is stored in a storage medium and includes several instructions for instructing a computer device having one or more processors (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a ROM, a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An object displaying method by a terminal device comprising a processor and a display screen, comprising:
   receiving data for a graphic map layer for an electronic game application;
   determining a first display region and a second display region on the display screen, wherein the second display region is within and overlaid on the first display region on the display screen;
   displaying at least a first portion of the graphic map layer in the first display region;
   identifying a target object of the electronic game application from the data, the target object being associated with the graphic map layer according to a first coordinate in the graphic map layer;
   obtaining a target display mode corresponding to the target object, the target display mode being used for visually identifying a current state of the target object among a plurality of states for the target object;
   displaying at least a second portion of the graphic map layer in the second display region on the display screen, wherein the second portion encompasses the target object according to the first coordinate for the target object in the graphic map layer;
   mapping the target object into the second display region of the display screen according to the first coordinate;
   displaying the target object in the second display region in the target display mode and according to the first coordinate; and
   switching and restoring contents between the first display region and the second display region of the display screen momentarily by activating and releasing a user interface element on the terminal device.

2. The method according to claim 1, wherein mapping the target object into the second display region of the display screen according to the first coordinate comprises:
   determining a second coordinate according to the first coordinate of the target object in the graphic map layer, the second coordinate being a relative coordinate of the target object in the second portion of the graphic map layer; and
   mapping the target object into the second display region according to the second coordinate.

3. The method according to claim 1, wherein before obtaining the target display mode corresponding to the target object, the method further comprises:
   obtaining a display mode correspondence list, the display mode correspondence list comprising a correspondence between the target object and a plurality of target display modes.

4. The method according to claim 3, wherein the display mode correspondence list comprises the plurality of states for the target object and the plurality of target display modes and correspondence relationship therebetween, and wherein obtaining the target display mode corresponding to the target object further comprises:
   obtaining attribute information of the target object;
   determining the current state of the target object according to the attribute information; and
   determining, according to the display mode correspondence list, the target display mode corresponding to the current state of the target object.

5. The method according to claim 4, wherein the attribute information of the target object comprises at least one of:
   the first coordinate of the target object in the graphic map layer; and
   an icon attribute of the target object, or a start moment at which the target object was generated for a first time and a time length for generating the target object.

6. The method according to claim 1, wherein the target display mode comprises an icon of the target object and at least one of: a color of the icon of the target object, a size of the icon of the target object, a flicker state of the icon of the target object, an animation state of the icon of the target object, or a shape of the icon of the target object.

7. The method according to claim 1, wherein the target object is outside of the first portion of the graphic map layer.

8. The method according to claim 1, wherein the second portion comprises a larger region of the graphic map layer than the first portion and encompasses the first portion.

9. The method according to claim 1, wherein the second portion and the first portion of the graphic map layer comprises distinct regions of the graphic map layer.

10. A terminal device, comprising:
    a memory for storing instructions;
    a display screen; and
    a processor in communication with the memory,
    wherein the processor, when executing the instructions, is configured to:
      receive data for a graphic map layer for an electronic game application;
      determine a first display region and a second display region on the display screen, wherein the second display region is within and overlaid on the first display region on the display screen;
      display at least a first portion of the graphic map layer in the first display region;
      identify a target object of the electronic game application from the data, the target object being associated with the graphic map layer according to a first coordinate in the graphic map layer;
      obtain a target display mode corresponding to the target object, the target display mode being used for visually identifying a current state of the target object among a plurality of states for the target object
      display at least a second portion of the graphic map layer in the second display region on the display screen, wherein the second portion encompasses the target object according to the first coordinate for the target object in the graphic map layer;
      map the target object into the second display region of the display screen according to the first coordinate;
      display the target object in the second display region in the target display mode and according to the first coordinate; and
      switch and restore contents between the first display region and the second display region of the display screen momentarily by activating and releasing a user interface element on the terminal device.

11. The terminal device of claim 10, wherein the processor, when executing the instructions to map the target object into the second display region of the display screen according to the first coordinate, is configured to:
    determine a second coordinate according to the first coordinate of the target object in the graphic map layer, the second coordinate being a relative coordinate of the target object in the second portion of the graphic map layer; and map the target object into the second display region according to the second coordinate.

12. The terminal device of claim 10, wherein the processor, before executing the instructions to obtain the target display mode corresponding to the target object, is configured to:

obtain a display mode correspondence list, the display mode correspondence list comprising a correspondence between the target object and a plurality of target display modes.

13. The terminal device of claim 12, wherein the display mode correspondence list comprises the plurality of states for the target object and the plurality of target display modes and correspondence relationship therebetween, and wherein the processor, when executing the instructions to obtain the target display mode corresponding to the target object, is further configured to:

obtain attribute information of the target object;

determine the current state of the target object according to the attribute information; and determine, according to the display mode correspondence list, the target display mode corresponding to the current state of the target object.

14. The terminal device of claim 13, wherein the attribute information of the target object comprises at least one of:

the first coordinate of the target object in the graphic map layer; and an icon attribute of the target object, or a start moment at which the target object was generated for a first time and a time length for generating the target object.

15. The terminal device of claim 10, wherein the target display mode comprises an icon of the target object and at least one of: a color of the icon of the target object, a size of the icon of the target object, a flicker state of the icon of the target object, an animation state of the icon of the target object, or a shape of the icon of the target object.

16. The terminal device of claim 10, wherein the target object is outside of the first portion of the graphic map layer.

17. The terminal device of claim 10, wherein the second portion comprises a larger region of the graphic map layer than the first portion and encompasses the first portion.

18. A non-transitory computer readable medium for storing instructions, wherein the instructions, when executed by a processor of an electronic device comprising a processor and a display screen, cause the electronic device to:

receive data for a graphic map layer for an electronic game application;

determine a first display region and a second display region on the display screen, wherein the second display region is within and overlaid on the first display region on the display screen;

display at least a first portion of the graphic map layer in the first display region;

identify a target object of the electronic game application from the data, the target object being associated with the graphic map layer according to a first coordinate in the graphic map layer;

obtain target display mode corresponding to the target object, the target display mode being used for visually identifying a current state of the target object among a plurality of states for the target object representing levels of life stages of the target object of the electronic game application;

display at least a second portion of the graphic map layer in the second display region on the display screen, wherein the second portion encompasses the target object according to the first coordinate for the target object in the graphic map layer;

map the target object into the second display region of the display screen according to the first coordinate;

display the target object in the second display region in the target display mode and according to the first coordinate; and switch and restore contents between the first display region and the second display region of the display screen momentarily by activating and releasing a user interface element on the terminal device.

19. The non-transitory computer readable medium of claim 18, wherein the instructions, when executed by the processor to map the target object into the second display region of the display screen according to the first coordinate, cause the electronic device to:

determine a second coordinate according to the first coordinate of the target object in the graphic map layer, the second coordinate being a relative coordinate of the target object in the second portion of the graphic map layer; and map the target object into the second display region according to the second coordinate.

20. The non-transitory computer readable medium of claim 18, wherein the instructions, before being executed by the processer to obtain the target display mode corresponding to the target object, cause the electronic device to:

obtain a display mode correspondence list, the display mode correspondence list comprising a correspondence between the target object and a plurality of target display modes.

21. The non-transitory computer readable medium of claim 20, wherein the display mode correspondence list comprises the plurality of states for the target object and the plurality of target display modes and correspondence relationship therebetween, and wherein the instructions, when being executed by the processor to obtain the target display mode corresponding to the target object, cause the electronic device to:

obtain attribute information of the target object;

determine the current state of the target object according to the attribute information; and determine, according to the display mode correspondence list, the target display mode corresponding to the current state of the target object.

* * * * *